March 8, 1966   J. W. BERG   3,238,610

METHOD OF PREPARING AND FLUID PRESSURE FORMING WELDED BLANKS

Filed April 13, 1964

INVENTOR.
JOHN W. BERG
BY Knox & Knox

United States Patent Office 3,238,610
Patented Mar. 8, 1966

3,238,610
METHOD OF PREPARING AND FLUID PRESSURE
FORMING WELDED BLANKS
John W. Berg, La Mesa, Calif., assignor, by mesne assignments, to The Bendix Corporation, a corporation of Delaware
Filed Apr. 13, 1964, Ser. No. 359,281
4 Claims. (Cl. 29—421)

This present invention relates generally to the art of fluid pressure forming sheet material articles from a plurality of interrelated sheet material sections.

This invention differs from the conventional method of forming articles of curved configuration by the application of fluid pressure to a single sheet of uniform thickness and is concerned primarily with the preparation of a blank from a plurality of sections of material. It is known to form such articles into deep draws by the application of fluid pressure thereto but the extent of deformation is limited by the permissible elongation. According to the present invention the article to be formed is first built up of a plurality of generally flat sheet material sections welded together at thickened edge portions to approximate the finished shape and then expanded to final form by the application of fluid pressure thereto.

The primary object of this invention is to provide an improved method of forming shaped articles from a plurality of sections of material welded together.

It is a further object of this invention to provide an improved method of preparing sections of a blank with thickened edge portion preparatory to welding at the edge portion to assure uniform strength throughout the entire area of the blank during a subsequent forming step.

It is a still further object of this invention to provide a novel method of forming deep drawn articles of built up sections of sheet material.

It is a still further and important object of this invention to form a sheet material article in the shape of a spherical segment from a preformed blank of substantially the shape of a truncated cone by the application of fluid pressure to bulge or reshape the blank into substantially spherical shape.

Other objects and advantages of the invention will be evident from the following detailed description, read in conjunction with the accompanying drawings, which illustrate a preferred form of my invention.

It is frequently desired to make deep draws in sheet material. This is difficult to do in a single step operation and still keep within the limits of elongation of the particular material used. I have found that by building a blank of welded sections to approximate the shape of the finished article it is possible to finish shape the blank by the application of fluid pressure thereto without exceeding the permissible elongation of the material. Deep drawn shapes may therefore be formed which heretofore have been impossible to obtain. Since welded joints do not have the uniform strength characteristics of the stock sheet material I find it necessary to form the section slightly over size in thickness and reduce the center portions thereof to form edges of increased thickness.

Figure 1:
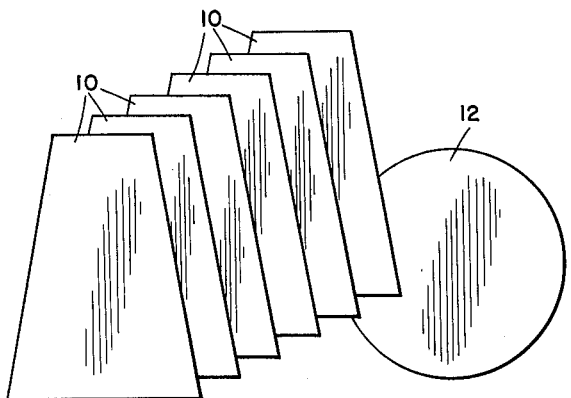
FIGURE 1 shows a plurality of sections prior to forming them into a blank.

In FIGURE 1 I have shown a series of segments including six, indicated by the reference numeral 10, in the shape of a truncated triangle and one, 12, of circular shape.

Figure 2:
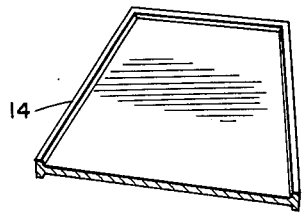
FIGURE 2 shows a representative section with the central portion reduced in thickness.

There are cut or formed in any suitable way from stock sheet material that is thicker than that required for the finished article. These sheets are then subjected to a process by which the central portions is reduced to the finished thickness leaving flanges 14 at the edge portion as shown in FIGURE 2. Any well known process may be used for reducing the thickness of the sheets. I prefer to accomplish this by means of chemically milling or etching away the excess metal. By this process I am able to reduce the thickness without setting up any objectionable stresses in the material.

Figure 3:
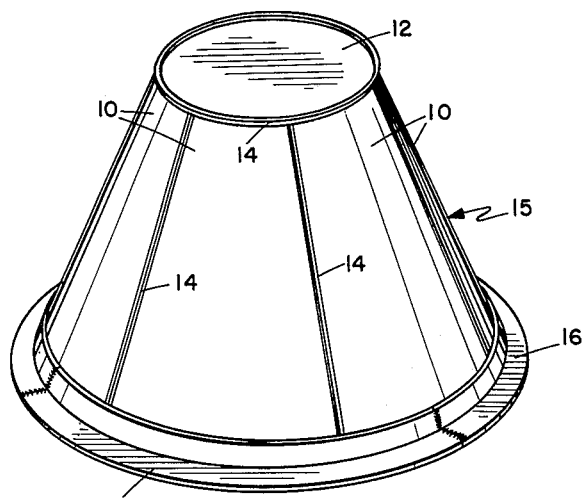
FIGURE 3 shows a blank formed of sections welded together in the shape of a truncated cone with a retaining ring secured to the base thereof.
Figure 5:
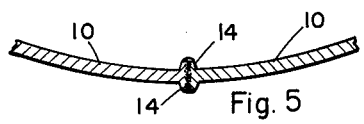
FIGURE 5 shows an exaggerated view of a welded joint taken on the line 5—5 of FIGURE 4.
Figure 4:
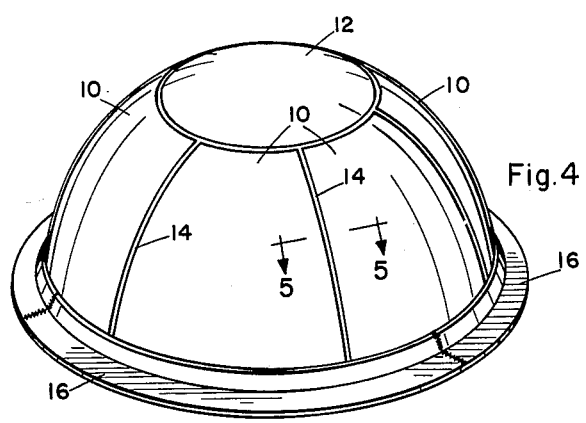
FIGURE 4 shows the blank of FIGURE 3 after the application of fluid pressure thereto.

The sections are now ready to be positioned and welded along the edges to form a truncated conical blank 15 such as shown in FIGURE 3. It may be necessary to roll the sections 10 so that they will assume the curved shape shown. However if the material is thin enough the sections may be readily deformed and held in this position while being secured by fusion or resistance welding. A securing flange formed of segmental sections 16 is now secured to the base of the blank. The only purpose of this flange is to permit mounting of the blank in hydraulic forming apparatus such as shown in my co-pending application 359,290 filed April 13, 1964. With the blank so mounted fluid pressure is applied to the interior thereof and it is expanded to the segmental spherical shape shown in FIGURE 4. The article is then removed from the forming apparatus. If it is desired to remove the flange 16 this may be done by a simple trimming operation. Depending upon the use to which the finished article is to be put the flanges 14 may either be allowed to remain in place or they may be removed by grinding. While I have shown the finished article in FIGURE 4 as being of segmental spherical shape it is understood that the method herein claimed is susceptible to other shapes depending upon the particular shape of the interrelated sections. The present method does not need any external shaping dies; however, if desired, dies or other means (not shown) may be utilized for applying a compression or external shaping to assist in the formation of the finished bodies.

From the foregoing it will be apparent that the present invention provides a novel method of reshaping a polygonal configurated body into a finished article which is economical and simple in its operation. The use of interrelated sections welded together to roughly the shape of the finished article makes possible the formation of deeply dished articles which, because of the permissible elongation, could not be formed from a single sheet of material.

While I have shown the finished product to be spherical in shape, it is to be understood that the above disclosed method can be used to form hollow bodies of virtually any configuration depending upon the size and shape of the blanks 10 and 12.

It is understood that minor variation from the form of the invention disclosed herein may be made without departure from the spirit and scope of the invention, and that the specification and drawings are to be considered as merely illustrative rather than limiting.

I claim:

1. The process of forming sheet material articles of curved configuration which comprises the steps of:

forming a plurality of interrelated sections of sheet material;

reducing the central portion of each section to leave thickened edge portions;

bonding the section together at said edge portions to form a hollow open ended blank, securing a flange on the open end of said blank; and applying fluid pressure to the interior of said blank to expand it to finished form while being held by said flange.

2. The process of forming sheet material articles of curved configuration which comprises the steps of:

forming a plurality of interrelated sections of sheet material;

reducing the central portion of each section to form thickened edge portions;

welding the sections together at said edge portions to form a hollow open ended blank, securing a flange on the open end of said blank; and applying fluid pressure to the interior of said blank to expand it to finished form while being held by said flange.

3. The process of forming sheet metal articles of curved configuration which comprises the steps of:

forming a plurality of interrelated sections of sheet metal;

reducing the central portion of each section to form thickened edge portions;

welding the sections together at said edge portions to form a hollow open ended blank, securing a flange on the open end of said blank; and applying fluid pressure to the blank to expand it to finished form while being held by said flange.

4. The process of forming sheet metal articles of curved configuration which comprises the steps of:

forming a plurality of interrelated sections of sheet metal;

reducing the central portion of each section by chemical milling to form thickened edge portions;

welding the sections together at said edge portions to form a hollow open ended blank, securing a flange on the open end of said blank; and applying fluid pressure to the blank to expand it to finished form while being held by said flange.

References Cited by the Examiner

UNITED STATES PATENTS

| 2,503,190 | 4/1950 | Branson | 29—407 |
| 2,503,191 | 4/1950 | Branson | 29—421 |
| 2,579,646 | 12/1951 | Branson | 29—421 |
| 2,751,667 | 6/1956 | Gruetjen | 29—156.8 |
| 3,135,486 | 6/1964 | Wing | 29—156.8 X |

WHITMORE A. WILTZ, *Primary Examiner.*

THOMAS H. EAGER, *Examiner.*